(12) United States Patent
Yamamura et al.

(10) Patent No.: US 9,184,637 B2
(45) Date of Patent: Nov. 10, 2015

(54) ROTOR OF ROTARY ELECTRIC MACHINE HAVING NON-MAGNETIC RING

(75) Inventors: Akihiro Yamamura, Chiyoda-ku (JP); Kazuhisa Takashima, Chiyoda-ku (JP); Hidechika Fujii, Chiyoda-ku (JP); Masayuki Miyaoka, Chiyoda-ku (JP); Satoru Akutsu, Chiyoda-ku (JP)

(73) Assignee: Mitsubishi Electric Corporation, Tokyo (JP)

( * ) Notice: Subject to any disclaimer, the term of this patent is extended or adjusted under 35 U.S.C. 154(b) by 567 days.

(21) Appl. No.: 13/577,346

(22) PCT Filed: Jun. 10, 2010

(86) PCT No.: PCT/JP2010/059844
§ 371 (c)(1),
(2), (4) Date: Aug. 6, 2012

(87) PCT Pub. No.: WO2011/155042
PCT Pub. Date: Dec. 15, 2011

(65) Prior Publication Data
US 2012/0313474 A1 Dec. 13, 2012

(51) Int. Cl.
*H02K 21/12* (2006.01)
*H02K 1/27* (2006.01)
*H02K 29/03* (2006.01)

(52) U.S. Cl.
CPC ............... *H02K 1/278* (2013.01); *H02K 29/03* (2013.01); *H02K 2201/03* (2013.01); *H02K 2213/03* (2013.01)

(58) Field of Classification Search
CPC .................... H02K 1/27; H02K 1/28
USPC .............. 310/156.12, 156.21, 156.28; 29/598
See application file for complete search history.

(56) References Cited

U.S. PATENT DOCUMENTS 4,930,201 A * 6/1990 Brown ............................ 29/598
5,486,730 A * 1/1996 Ludwig et al. ........... 310/156.28
(Continued)

FOREIGN PATENT DOCUMENTS

| CN | 101420140 A | 4/2009 |
|---|---|---|
| JP | 55-120285 A | 8/1980 |

(Continued)

OTHER PUBLICATIONS

Japanese Office Action issued Aug. 6, 2013, Patent Application No. 2012-519173.
(Continued)

*Primary Examiner* — Joshua Benitez-Rosario
*Assistant Examiner* — Jose Gonzalez Quinones
(74) *Attorney, Agent, or Firm* — Sughrue Mion, PLLC; Richard C. Turner (57) ABSTRACT

A rotor of a rotary electric machine according to the present invention includes: a rotor core arranged on the outer circumferential side of a rotor shaft; and a plurality of magnetic poles fixed to the rotor core and circumferentially arranged on the rotor core, the rotor including a non-magnetic ring attached by insertion to the outer circumference of the plurality of the magnetic poles and having a substantially polygonal shape in outer circumferential shape. The non-magnetic ring is configured such that the inner circumferential length L of the non-magnetic ring before assembly with respect to the length of an envelope $L_0$ of tangent lines each between the outer circumferential surface of the magnetic pole and the outer circumferential surface of the adjacent magnetic pole is set to $L \leq L_0$. An object is to obtain the rotor of the rotary electric machine capable of achieving reduction in size and cost.

18 Claims, 5 Drawing Sheets

(56) References Cited

U.S. PATENT DOCUMENTS

2008/0111435 A1    5/2008  Maeda
2009/0102304 A1*   4/2009  Yamamura et al. ...... 310/156.28
2010/0018032 A1    1/2010  Yamamura et al.

FOREIGN PATENT DOCUMENTS

| JP | 2001-025193 A | 1/2001 |
| JP | 2001025193 A | 1/2001 |
| JP | 2009-106065 A | 5/2009 |
| JP | 2009106065 A | 5/2009 |
| WO | 2006/051934 A1 | 5/2006 |
| WO | 2006051934 A1 | 5/2006 |

OTHER PUBLICATIONS

Communication dated Oct. 20, 2014, issued by the State Intellectual Property Office of the People's Republic of China in corresponding Chinese Application No. 201080065230.6.

Chinese Office Action issued Mar. 5, 2014, Patent Application No. 2010800652306.

* cited by examiner

ROTOR OF ROTARY ELECTRIC MACHINE HAVING NON-MAGNETIC RING

CROSS REFERENCE TO RELATED APPLICATIONS

This application is a National Stage of International Application No. PCT/JP2010/059844 filed Jun. 10, 2010, the contents of all of which are incorporated herein by reference in their entirety.

TECHNICAL FIELD

The present invention relates to a rotor of a rotary electric machine having a plurality of magnetic poles made of, for example, permanent magnets.

BACKGROUND ART

As a conventional rotor of a rotary electric machine having a plurality of magnetic poles made of permanent magnets on the outer circumference of a rotor core fixed to the outer circumference of a rotor shaft, there is known one disclosed in Japanese Unexamined Patent Publication No. 2001-25193. The rotor of the rotary electric machine disclosed in Japanese Unexamined Patent Publication No. 2001-25193 has the rotor core laminated on the outer circumference of the rotor shaft and the permanent magnets on the outer circumference of the rotor core; and a permanent magnet scattering prevention cover made of a non-magnetic member that covers both end portions of the permanent magnets is disposed. The permanent magnet scattering prevention cover made of the non-magnetic member is fixed to the permanent magnets with adhesive.

Furthermore, as other conventional rotor of a rotary electric machine other than the aforementioned conventional rotor of the rotary electric machine, there is known one disclosed in Japanese Unexamined Utility Model Application Publication No. S55-120285. In the rotor of the rotary electric machine disclosed in Japanese Unexamined Utility Model Application Publication No. S55-120285, permanent magnets are arranged on the outer circumference of a yoke, the outer circumference of the permanent magnets is covered with a non-magnetic tubular fastening ring, and the non-magnetic tubular fastening ring is pushed to a yoke portion between the permanent magnets from the outer circumference to fix by a fastening member such as bolts.

Patent Document 1: Japanese Unexamined Patent Publication No. 2001-25193
Patent Document 2: Japanese Unexamined Utility Model Application Publication No. S55-120285

DISCLOSURE OF THE INVENTION

Problems to be Solved by the Invention

In the aforementioned conventional rotor of the rotary electric machine, the rotor of the rotary electric machine disclosed in Japanese Unexamined Patent Publication No. 2001-25193 defines the circumferential position of the permanent magnets by fixing the rotor core to the permanent magnets by adhesion, or by fixing the permanent magnets to the permanent magnet scattering prevention cover by adhesion.

However, the circumferential position of the permanent magnets cannot be fixed during the time until the adhesive has cured or the adhesive does not have sufficient fixation force at the worst. The circumferential position of the permanent magnets gives a large influence on cogging torque of a motor; and therefore, in the case where the position of the permanent magnets cannot be fixed, a problem exist that the degradation and fluctuation of the cogging torque is generated.

Further, a problem exists in that there is a possibility to generate a state where the permanent magnet scattering prevention cover made of the non-magnetic member is deformed in an outer circumferential direction due to centrifugal force applied during the rotation of the rotor, the gap between a stator and the rotor is narrowed, and the rotation of the rotor is disturbed or locked.

Furthermore, in the rotor of the rotary electric machine disclosed in Japanese Unexamined Utility Model Application Publication No. S55-120285, the non-magnetic tubular fastening ring is pushed from the outer circumference; and accordingly, constriction force against the permanent magnets is generated to fix the position of the permanent magnets.

However, the fastening member such as bolts is needed; and therefore, a problem exists that it causes an increase in material cost and processing cost to increase in cost. Further, the gap between the permanent magnets needs to be more widened than the fastening member and it causes a decrease in torque in the case of the same constitution. In addition, a problem exists that axial length is increased in order to compensate the decrease in torque and accordingly it causes an increase in size and cost.

The present invention has been made to solve the problem described above, and an object of the present invention is to obtain a rotor of a rotary electric machine capable of achieving reduction in size and cost without disturbing the rotation of a rotor.

Means for Solving the Problems

According to the present invention, there is provided a rotor of a rotary electric machine, which includes: a rotor core arranged on the outer circumferential side of a rotor shaft; and a plurality of magnetic poles fixed to the rotor core and circumferentially arranged on the rotor core. The rotor includes a non-magnetic ring attached by insertion to the outer circumference of the plurality of the magnetic poles and having a substantially polygonal shape in outer circumferential shape. The non-magnetic ring is configured such that the inner circumferential length L of the non-magnetic ring before assembly with respect to the length of an envelope $L_0$ of tangent lines each between the outer circumferential surface of the magnetic pole and the outer circumferential surface of the other adjacent magnetic pole is set to $L \leq L_0$.

Advantageous Effect of the Invention

In a rotor of a rotary electric machine according to the present invention, a non-magnetic ring is configured such that the inner circumferential length L of the non-magnetic ring before assembly with respect to the length of an envelope $L_0$ of tangent lines each between the outer circumferential surface of a magnetic pole and the outer circumferential surface of the adjacent magnetic pole is set to $L \leq L_0$, whereby the rotor of the rotary electric machine capable of achieving reduction in size and cost without disturbing the rotation of the rotor can be obtained.

MODE FOR CARRYING OUT THE INVENTION

Embodiment 1

Hereinafter, a rotor of a rotary electric machine according to Embodiment 1 of the present invention will be described based on FIG. 1 to FIG. 5.

Figure 1:
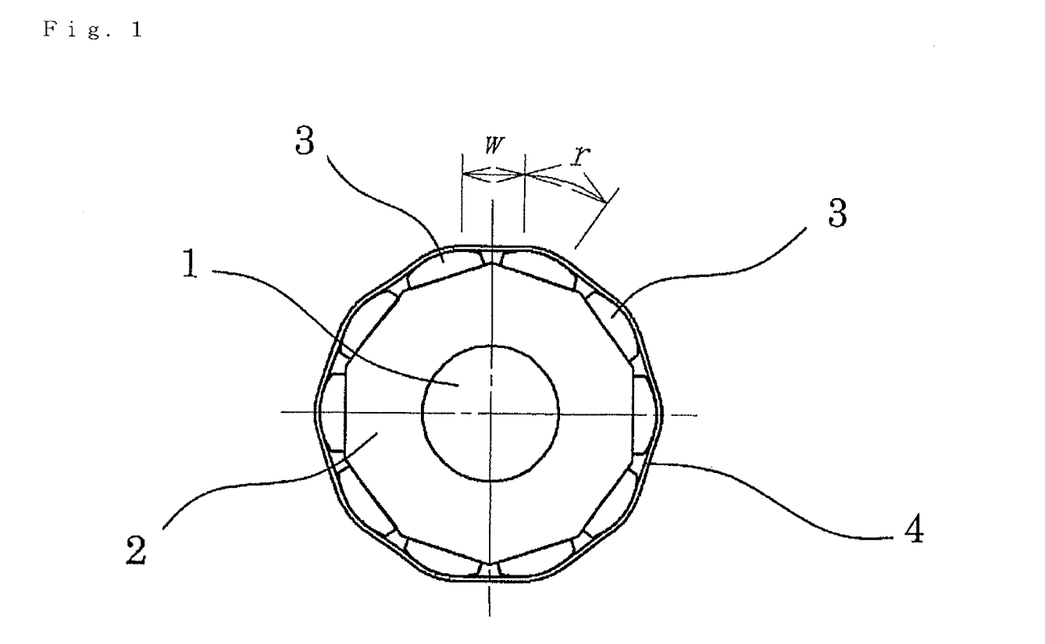
FIG. 1 is a transverse sectional view showing a rotor of a rotary electric machine according to Embodiment 1 of the present invention.
Figure 2:
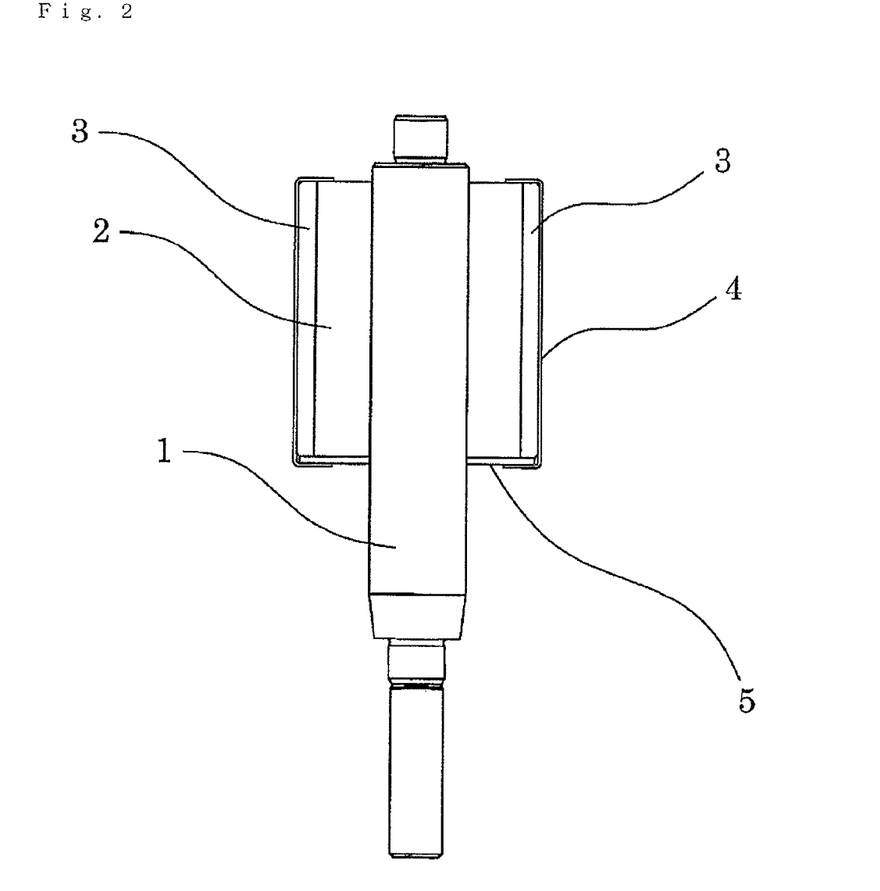
FIG. 2 is a longitudinal sectional view showing the rotor of the rotary electric machine according to Embodiment 1 of the present invention.
Figure 3:
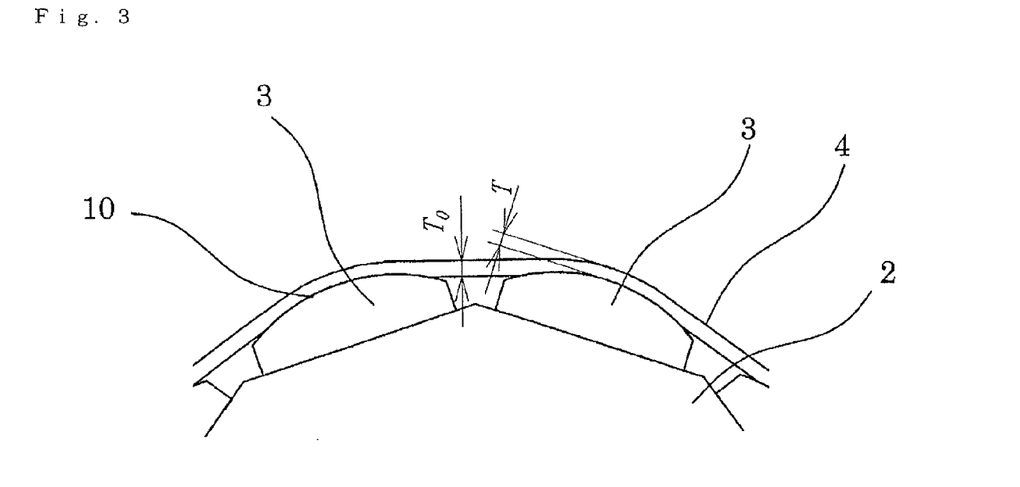
FIG. 3 is a partially enlarged transverse sectional view showing the rotor of the rotary electric machine according to Embodiment 1 of the present invention.
Figure 4:
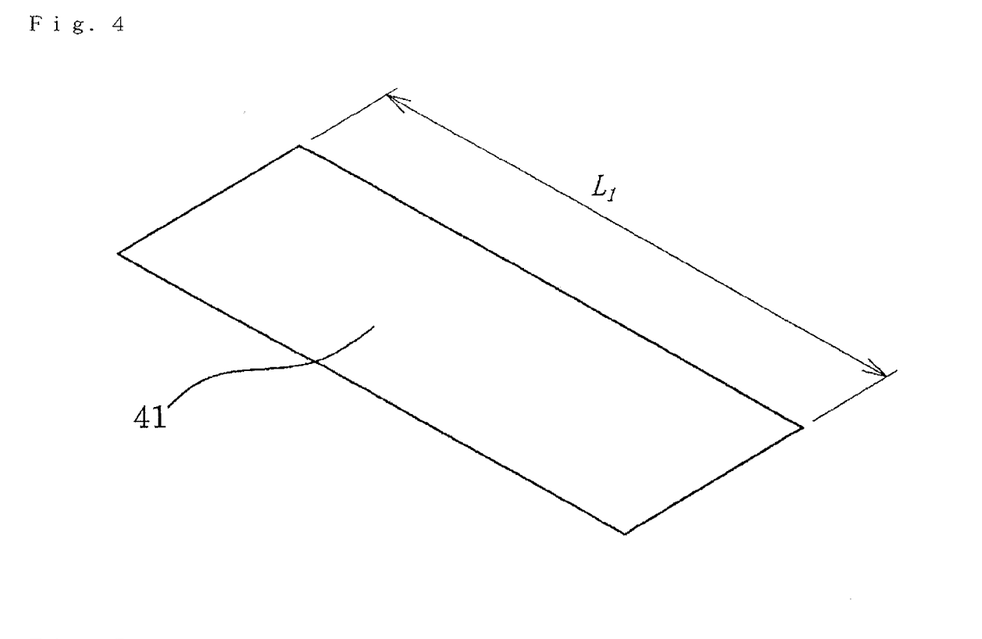
FIG. 4 is a perspective view showing a non-magnetic ring for the rotor of the rotary electric machine according to Embodiment 1 of the present invention.
Figure 5:
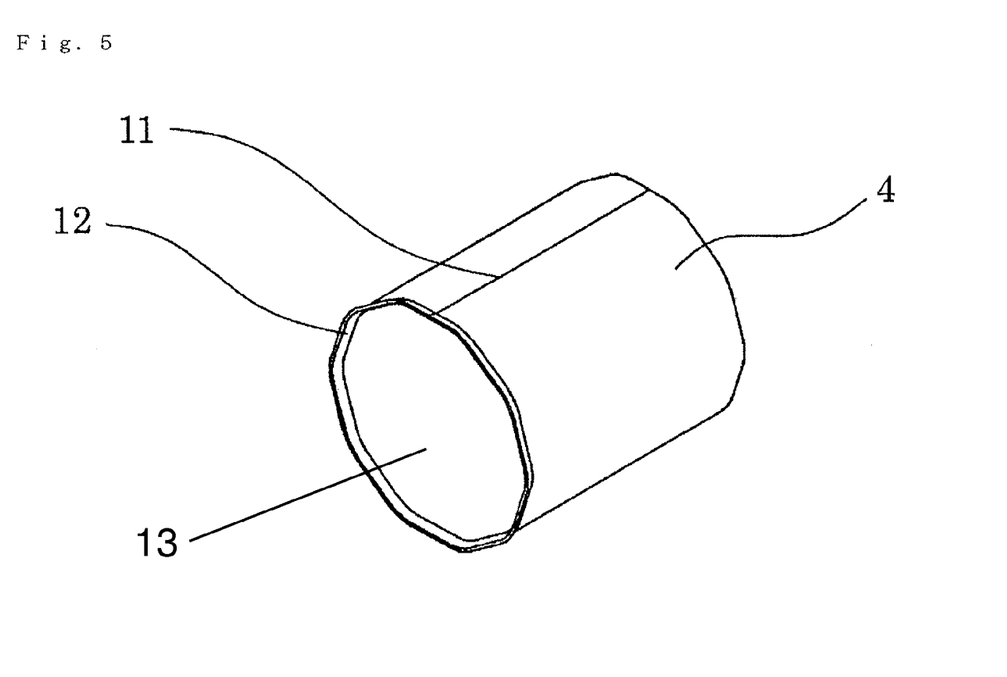
FIG. 5 is a perspective view showing the non-magnetic ring for the rotor of the rotary electric machine according to Embodiment 1 of the present invention.

FIG. 1 is a transverse sectional view showing the rotor of the rotary electric machine according to Embodiment 1 of the present invention. FIG. 2 is a longitudinal sectional view showing the rotor of the rotary electric machine according to Embodiment 1 of the present invention. FIG. 3 is a partially enlarged transverse sectional view showing the rotor of the rotary electric machine according to Embodiment 1 of the present invention. FIG. 4 is a perspective view showing a non-magnetic ring for the rotor of the rotary electric machine according to Embodiment 1 of the present invention. FIG. 5 is a perspective view showing the non-magnetic ring for the rotor of the rotary electric machine according to Embodiment 1 of the present invention.

In these respective drawings, reference numeral 1 denotes a rotor shaft of the rotor of the rotary electric machine; and 2 denotes a rotor core arranged on the outer circumferential side of the rotor shaft 1 and is formed, for example, in a regular decagon in transverse section thereof. The rotor core 2 is fixed to the rotor shaft 1 by means such as press-fitting. 3 denotes magnetic poles (hereinafter, referred to as permanent magnets) made of, for example, permanent magnets, which are arranged on the outer circumferential side of the rotor core 2 in plural numbers, that is, n numbers (for example, 10 numbers in the drawing) via a gap of a circumferentially equal pitch and are provided with an outer circumferential surface formed in a substantially circular arc shape. Then, these permanent magnets 3 are fixed to the rotor core 2 by being bonded to the outer circumferential surface of the rotor core 2 with adhesive.

4 denotes anon-magnetic ring formed of, for example, stainless steel serving as a non-magnetic material, and the non-magnetic ring 4 is attached by insertion so as to cover the outer circumferential surface of the permanent magnets 3 fixed to the outer circumferential surface of the rotor core 2. 5 denotes an endplate and the endplate 5 is fixed to an end face of the rotor core 2 by means such as caulking.

Furthermore, the non-magnetic ring 4 is a substantially polygonal shape in which contact points 10 with the permanent magnets 3 are regarded as substantially vertexes. The length of an envelope $L_0$ of tangent lines each between the outer circumferential surface of the permanent magnet 3 and the outer circumferential surface of the other adjacent permanent magnet 3 with respect to the contour length between the contact, points $r_n$ of an outer circumference portion of the permanent magnets 3 and the distance between the contact points $w_n$ of the adjacent permanent magnets 3 is expressed as the following equation.

$$L_o = \sum_{k=1}^{n} (r_k + w_k) \qquad \text{[Equation 1]}$$

In this case, the inner circumferential length L 13 of the non-magnetic ring 4 before attaching by insertion to the outer circumferential surface of the permanent magnets 3, that is, before assembly with respect to the length of the envelope $L_0$ is set to $L \leq L_0$. Furthermore, the plate thickness of an abutment portion T of the permanent magnets 3 with respect to the plate thickness of other than the abutment portion $T_0$ of the permanent magnets 3 of the non-magnetic ring 4 is set to $T < T_0$.

In the thus configured rotor of the rotary electric machine, the inner circumferential length of the non-magnetic ring 4 after assembly with respect to the inner circumferential length L of the non-magnetic ring 4 before assembly is extended to $L_0$. The inner circumferential length of the non-magnetic ring 4 is extended to $L_0$ as described above; and accordingly, the plate thickness T of the abutment portions coming into contact with the permanent magnets 3 is extended to be $T < T_0$, radial biasing force is strongly applied to the permanent magnets 3, and a circumferential position can be regulated by the polygonal shape of the non-magnetic ring 4.

Therefore, this allows to prevent the permanent magnets 3 from peeling off and scattering also against an excessive centrifugal force load. Further, it becomes easy to regulate the arrangement of the position of the permanent magnets 3, which is effective for countermeasures against cogging. Furthermore, the plate thickness T of the non-magnetic ring 4 at the abutment portions of the permanent magnets 3 becomes thinner as compared to the plate thickness $T_0$ other than the abutment portions of the permanent magnets 3 to form concave portions; and accordingly, high biasing force can be applied to the permanent magnets 3 and the circumferential position of the permanent magnets 3 can be regulated.

Next, a method of manufacturing the non-magnetic ring for the rotor of the rotary electric machine according to Embodiment 1 will be described based on FIG. 4 and FIG. 5. FIG. 4 is the perspective view showing the non-magnetic ring for the rotor of the rotary electric machine according to Embodiment 1 of the present invention. FIG. 5 is the perspective view showing the non-magnetic ring for the rotor of the rotary electric machine according to Embodiment 1 of the present invention.

The non-magnetic ring 4 is formed from a flat plate member 41 developed in a flat plate shape as shown in FIG. 4. The developed length L1 of the flat plate member 41 except for joint portions with respect to the inner circumferential length L of the non-magnetic ring 4 is set to $L_1 < L$. The flat plate member 41 is curved to form in a ring shape and both end portions are joined to form the non-magnetic ring 4.

More specifically, both ends of the flat plate member 41 are abutted at the position of joint portions 11 to be joined by tungsten inert gas (TIG) welding. Of course, the joining method is not limited to this; but laser beam welding, ultrasonic welding, and the like may be used. Furthermore, after the flat plate member 41 is formed in a ring shape and then welded; the inner circumference of the ring is processed by, for example, ironing and expanding its inner diameter to form the non-magnetic ring 4 of a substantially polygonal shape of the inner circumferential length L.

Further, one end portion 12 of the non-magnetic ring 4 is expanded in a taper shape to the outer circumferential side. The inner circumferential length $L_3$ of the tapered portion with respect to the inner circumferential length L of the non-magnetic ring 4 other than the tapered portion and the length of the envelope $L_0$ of the outer circumference of the permanent magnets 3 is set to $L \leq L_0 < L_3$.

As described above, the ring shape is formed from the plate shape; and accordingly, material yield ratio in the manufacture of the ring is better as compared to deep drawing by press working or the like. Furthermore, it becomes possible to form the ring of thin material, which allows manufacturing with low cost as compared to the case where something in a ring state is cut out to be a predetermined length.

Further, the flat plate member being set to $L_1 \leq L$ is stretch-formed to the inner circumferential length L; and accordingly, dimensional change in inner circumferential length due to material hardness and dimensional variation can be suppressed. Further, in the case where the tapered portion 12 of the end portion of the non-magnetic ring 4 is not formed, the inner circumferential length L of the non-magnetic ring 4 is shorter than the length of the envelope $L_0$ of the outer circumference of the permanent magnets. Thus, in the case of assembling by press-fitting or the like, workability is bad when the non-magnetic ring 4 is put on the outer circumference of the permanent magnets 3. However, the inner circumferential length $L_3$ of the tapered portion 12 formed on the end portion of the non-magnetic ring 4 is configured to be larger than the length of the envelope $L_0$ of the outer circumference of the permanent magnets; and accordingly, the non-magnetic ring 4 can be easily put on the outer circumference of the permanent magnets 3 from the tapered portion 12 side of the end portion, workability is improved, and low cost can be achieved.

Next, a method of assembling the rotor of the rotary electric machine according to Embodiment 1 will be described. Lubricant (not shown in the drawing) such as oil, paraffin, or wax is applied to the inner circumferential surface of the non-magnetic ring 4 or the outer circumferential surface of the permanent magnets 3; and the non-magnetic ring 4 is press-fitted to the outer circumferential surface of the permanent magnets 3 using the tapered portion 12 side, in which one end portion of the a non-magnetic ring 4 is expanded in a tapered shape, as an inlet.

As described above, the lubricant such as oil, paraffin, or wax is applied between the inner circumferential surface of the non-magnetic ring 4 and the outer circumferential surface of the permanent magnets 3; and accordingly, the frictional force between the inner circumferential surface of the non-magnetic ring 4 and the outer circumferential surface of the permanent magnets 3 can be reduced. Thus, the non-magnetic ring 4 can be easily put on the outer circumferential surface of the permanent magnets 3, workability is further improved, and low cost can be further achieved.

Embodiment 2

Figure 6:
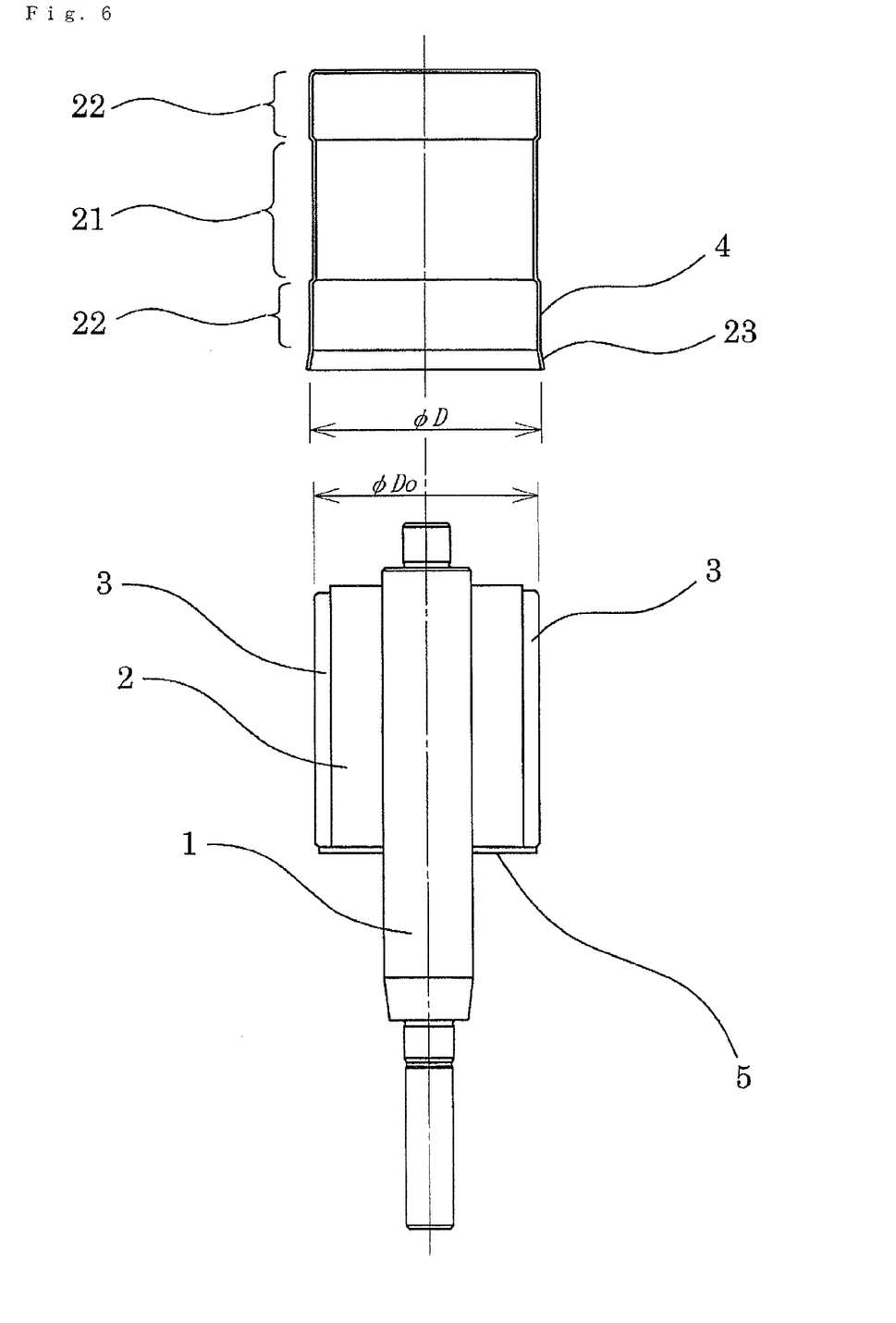
FIG. 6 is a longitudinal sectional view showing a rotor of a rotary electric machine according to Embodiment 2 of the present invention.

A rotor of a rotary electric machine according to Embodiment 2 of the present invention will be described based on FIG. 6. FIG. 6 is a longitudinal sectional view showing the rotor of the rotary electric machine according to Embodiment 2 of the present invention.

In Embodiment 2, the inner circumferential length L of a central portion 21 of a non-magnetic ring 4 with respect to the length of an envelope $L_0$ of the outer circumference of permanent magnets 3 is set to $L \leq L_0$. On the other hand, the inner circumferential length $L_2$ of two portions of both end portions 22 of the non-magnetic ring 4 is set to $L_0 < L_2$. Furthermore, a tapered portion 23 expanded in a round taper shape to the outer circumferential side is formed on one end portion of the non-magnetic ring 4 and the inner circumferential diameter ΦD of the tapered portion 23 with respect to the circumscribed circle diameter $ΦD_0$ of the permanent magnets 3 is set to $ΦD_0 < ΦD$.

In the thus configured non-magnetic ring 4, a portion where the inner circumferential length L is extended to $L_0$ during assembly of the non-magnetic ring 4 is limited to the central portion 21; and therefore, putting force during the assembly of the non-magnetic ring 4 is reduced and assembly becomes easy. More particularly, the inner circumferential length $L_2$ of two portions of both end portions 22 of the non-magnetic ring 4 on the putting side is longer than the inner circumferential length L of the central portion 21; and therefore, putting workability is further improved. Furthermore, an excessive load is not applied to the permanent magnets 3 while fixing the position of the permanent magnets 3; and therefore, the permanent magnets 3 can be prevented from cracking and the like. In addition, the non-magnetic ring 4 can be easily put on the outer circumference of the permanent magnets 3 from the tapered portion 23 side, workability is improved, and low cost can be achieved.

Further, in the case where the length of the envelope $L_0$ and the inner circumferential length $L_2$ with respect to the circumferential length $π × ΦD_0$ of the circumscribed circle diameter $ΦD_0$ of the permanent magnets 3 are set to $L_0 < L_2 \leq (π × ΦD_0)$, the outer circumferential diameter of the ring after putting both end portions 22 of the non-magnetic ring 4 is only increased by two times of plate thickness T with respect to $ΦD_0$ while suppressing the putting force of the non-magnetic ring 4; and therefore, the gap between the rotor and a stator (not shown in the drawing) is not narrowed, assembly property of the rotary electric machine is not impaired, and the possibility of generating a state where the rotation of the rotor is disturbed and locked can be suppressed.

Next, a method of manufacturing the rotor of the rotary electric machine according to Embodiment 2 will be described. An arrangement is made in a state where the permanent magnets 3 are bonded or held to the outer circumference of a rotor core 2, the non-magnetic ring 4 preliminarily formed in a ring shape are press-fitted from one end portion of the rotor core 2 so as to come into contact with the outer circumference of the permanent magnets 3, and abutment portions against the permanent magnets 3 of the non-magnetic ring 4 are extended and deformed; and accordingly, the non-magnetic ring 4 of a polygonal shape is formed.

Furthermore, a lubricative film (not shown in the drawing) such as molybdenum sulfide containing plating, resin containing nickel plating, and fluorine resin coating is formed on the inner circumferential surface of the non-magnetic ring 4.

In the thus configured rotor of the rotary electric machine, the non-magnetic ring 4 before press-fitting can be formed in a circular tube shape; and therefore, manufacturing is easy. Furthermore, positioning of the vertexes of the polygon of the non-magnetic ring 4 and the permanent magnets 3 is not needed; and therefore, circumferential positioning during putting of the non-magnetic ring 4 is eliminated. Further, the non-magnetic ring 4 is circumferentially extended in the process of press-fitting; and accordingly, dimensional variation in outer diameter of the rotor and inner diameter of the non-magnetic ring 4 can be absorbed. In addition, the non-magnetic ring 4 having a high fastening margin by the lubricative film formed on the inner circumferential surface of the non-magnetic ring 4 can be assembled with low putting force and the non-magnetic ring 4 and the permanent magnets 3 can be prevented from being damaged. Further, workability is better as compared to a method of applying lubricant during assembly.

Incidentally, in Embodiment 2, the non-magnetic ring 4 is press-fitted as described above. However, it may be configured such that, after a non-magnetic ring 4 preliminarily formed in a ring shape is heated to be thermally expanded, this thermally expanded non-magnetic ring 4 is put on the outer circumference of the permanent magnets 3 from one end portion of the rotor core 2; and the non-magnetic ring 4 is cooled and accordingly abutment portions against the permanent magnets 3 of the non-magnetic ring 4 are deformed to form the non-magnetic ring 4 of a polygonal shape. As described above, the non-magnetic ring 4 before press-fitting can be formed in a circular tube shape even by using thermal expansion; and therefore, manufacture is easy. Furthermore, positioning of the vertexes of the polygon of the non-magnetic ring 4 and the permanent magnets 3 is not needed; and therefore, circumferential positioning during putting of the non-magnetic ring 4 is eliminated. In addition, biasing force can be further applied to the permanent magnets 3 by thermal stress.

Embodiment 3

Figure 7:
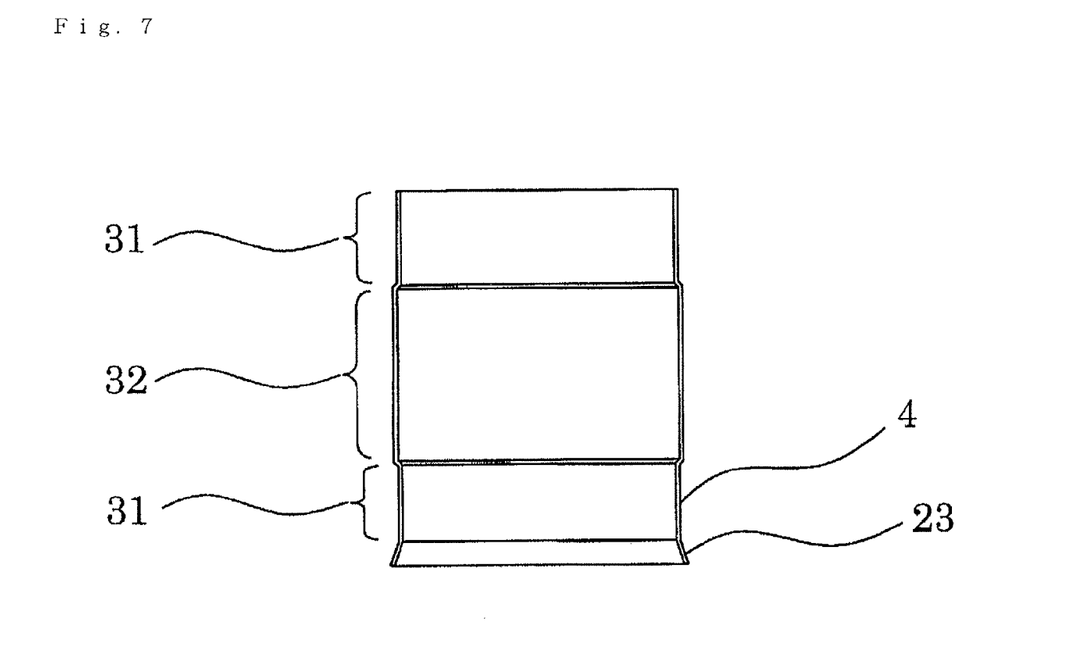
FIG. 7 is a longitudinal sectional view showing a non-magnetic ring for a rotor of a rotary electric machine according to Embodiment 3 of the present invention.
Figure 8:
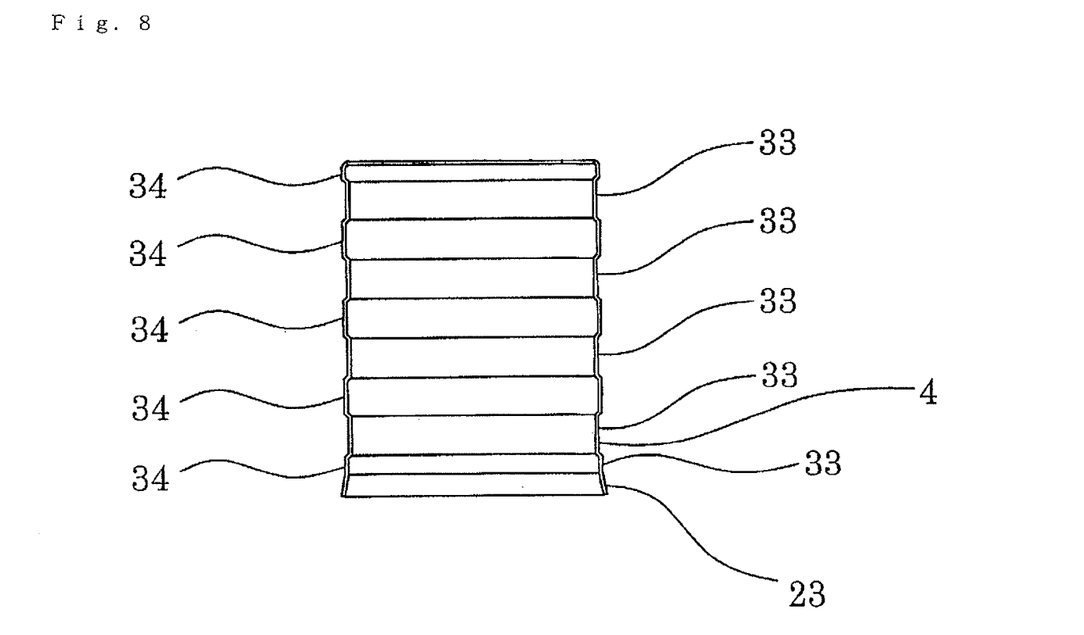
FIG. 8 is a longitudinal sectional view showing another example of a non-magnetic ring for the rotor of the rotary electric machine according to Embodiment 3 of the present invention.

A rotor of a rotary electric machine according to Embodiment 3 of the present invention will be described based on FIG. 7 and FIG. 8. FIG. 7 is a longitudinal sectional view showing a non-magnetic ring for the rotor of the rotary electric machine according to Embodiment 3 of the present invention. FIG. 8 is a longitudinal sectional view showing another example of a non-magnetic ring for the rotor of the rotary electric machine according to Embodiment 3 of the present invention.

In FIG. 7, the inner circumferential length L of both end portions 31 of a non-magnetic ring 4 with respect to the length of an envelope $L_0$ of the outer circumference of permanent magnets 3 is set to $L<L_0$. On the other hand, the inner circumferential length $L_2$ of a central portion 32 of the non-magnetic ring 4 is set to $L_0<L_2$. Furthermore, a tapered portion 23 expanded in a round taper shape to the outer circumferential side is formed on one end portion of the non-magnetic ring 4 and the inner circumferential diameter $\Phi D$ of the tapered portion 23 with respect to the circumscribed circle diameter $\Phi D_0$ of the permanent magnets 3 is set to $\Phi D_0 < \Phi D$.

In the thus configured non-magnetic ring, a portion where the inner circumferential length L of the non-magnetic ring 4 is extended to the length of the envelope $L_0$ of the outer circumference of the permanent magnets 3 during assembly is limited to both end portions 31 of the non-magnetic ring 4; and therefore, putting force during assembly of the non-magnetic ring 4 is reduced as in the aforementioned Embodiment 2 and assembly becomes easier.

Furthermore, the circumferential position of the permanent magnets 3 can be regulated by both end portions 31 of the non-magnetic ring 4; and therefore, the permanent magnets 3 can be suppressed from falling and the circumferential position of the permanent magnets 3 can be highly accurately regulated as compared to the case where the non-magnetic ring 4 is regulated by one point of the central portion as in the aforementioned Embodiment 2. In addition, the non-magnetic ring 4 can be easily put on the outer circumference of the permanent magnets 3 from the tapered portion 23 side, workability is improved, and low cost can be achieved.

Furthermore, in FIG. 8, the inner circumferential length L of a plurality of axial portions 33 of a non-magnetic ring 4 with resect to the length of an envelope $L_0$ of the outer circumference of permanent magnets 3 is set to $L \leq L_0$. On the other hand, the inner circumferential length $L_2$ of a plurality of portions 34 other than the plurality of portions 33 of the non-magnetic ring 4 is set to $L_0 < L_2$. That is, the configuration is made such that a portion of $L \leq L_0$ of the non-magnetic ring 4 and a portion of $L_0 < L_2$ of the non-magnetic ring 4 are alternatively arranged. In addition, a tapered portion 23 expanded in a round taper shape to the outer circumferential side is formed on one end portion of the non-magnetic ring 4, and the inner circumferential diameter $\Phi D$ of the tapered portion 23 with respect to the circumscribed circle diameter $\Phi D_0$ of the permanent magnets 3 is set to $\Phi D_0 < \Phi D$.

In the thus configured non-magnetic ring, a portion where the inner circumferential length L is extended to L0 during assembly is limited; and therefore, putting force during assembly of the non-magnetic ring 4 is reduced as in the aforementioned Embodiment 2 and the non-magnetic ring 4 of the configuration shown in FIG. 7, and assembly becomes easier. Furthermore, the circumferential position of permanent magnets 3 can be regulated in a wide axial range while reducing the putting force of the non-magnetic ring 4; and therefore, the permanent magnets 3 can be suppressed from falling and the circumferential position of the permanent magnets 3 can be highly accurately regulated. In addition, the non-magnetic ring 4 can be easily put on the outer circumference of the permanent magnets 3 from the tapered portion 23 side, workability is improved, and low cost can be achieved.

Next, a method of assembling the rotor of the rotary electric machine according to Embodiment 3 will be described. Adhesive (not shown in the drawing) is applied to the inner circumferential surface of the non-magnetic ring 4 or the outer circumferential surface of the permanent magnets 3; and the non-magnetic ring 4 is press-fitted to the outer circumferential surface of the permanent magnets 3 using the tapered portion 23 side expanded in a tapered shape as an inlet.

Biasing force is applied to the permanent magnets 3 by the non-magnetic ring 4 and fixation is made with the adhesive; and accordingly, the circumferential position of the permanent magnets 3 can be reliably regulated. Furthermore, by the lubrication effect of the adhesive, the non-magnetic ring 4 having a high fastening margin can be assembled by low putting force without forming lubricant such as oil and an expensive lubricative film; and therefore, the non-magnetic ring 4 and the permanent magnets 3 can be prevented from being damaged.

INDUSTRIAL APPLICABILITY

The present invention is suitable for achieving a rotor of a rotary electric machine capable of achieving reduction in size and cost without disturbing the rotation of a rotor.

The invention claimed is:
1. A rotor of a rotary electric machine, comprising:
a rotor core arranged on the outer circumferential side of a rotor shaft; and
a plurality of magnetic poles fixed to said rotor core and circumferentially arranged on said rotor core, said rotor including
a non-magnetic ring attached by insertion to the outer circumference of the plurality of said magnetic poles and having a substantially polygonal shape in outer circumferential shape,
said non-magnetic ring being configured such that the inner circumferential length L of said non-magnetic ring before assembly with respect to the length of an envelope $L_0$ of tangent lines each between the outer circumferential surface of said magnetic pole and the outer circumferential surface of said adjacent magnetic pole is set to $L<L_0$.

2. The rotor of the rotary electric machine according to claim 1,
wherein said non-magnetic ring is configured such that the inner circumferential length L of said non-magnetic ring before assembly with respect to the length of an envelope $L_0$ of tangent lines each between the outer circumferential surface of said magnetic pole and the outer circumferential surface of said adjacent magnetic pole is set to $L \leq L_0$ in an axial portion or a plurality of axial portions of said rotor shaft, and is set to $L_0<L$ in other portion.

3. The rotor of the rotary electric machine according to claim 2,
wherein the plate thickness T of a portion at which said non-magnetic ring comes into contact with the outer circumferential surface of said magnetic pole with respect to the plate thickness $T_0$ of a portion at which said non-magnetic ring does not come into contact with the outer circumferential surface of said magnetic pole is set to $T<T_0$.

4. The rotor of the rotary electric machine according to claim 2,
wherein said non-magnetic ring is configured such that the inner circumferential length $L_3$ of at least one end portion of said non-magnetic ring before assembly with respect to the length of an envelope $L_0$ of tangent lines each between the outer circumferential surface of said magnetic pole and the outer circumferential surface of said other adjacent magnetic pole is set to $L_0<L_3$.

5. The rotor of the rotary electric machine according to claim 2,
wherein said non-magnetic ring is configured such that at least one end portion of said non-magnetic ring before assembly is a round shape and the inner circumferential diameter $\Phi D$ with respect to the circumscribed circle diameter $\Phi D_0$ of said magnetic poles is set to $\Phi D_0<\Phi D$.

6. The rotor of the rotary electric machine according to claim 2,
wherein said non-magnetic ring is configured such that a flat plate shaped material is curved and both ends thereof are joined to be formed in a ring shape, and
developed length $L_1$ except for joint portions of said flat plate shaped material with respect to the inner circumferential length L of said non-magnetic ring before assembly is set to $L_1 \leq L$.

7. The rotor of the rotary electric machine according to claim 1,
wherein said non-magnetic ring is configured such that the inner circumferential length L of said non-magnetic ring before assembly with respect to the length of an envelope $L_0$ of tangent lines each between the outer circumferential surface of said magnetic pole and the outer circumferential surface of said other adjacent magnetic pole and the circumscribed circle diameter $\Phi D_0$ of said magnetic poles is set to $L \leq L_0$ in an axial portion or a plurality of axial portions of said rotor shaft, and is set to $L_0<L \leq (\pi \times \Phi D_0)$ in other portion.

8. The rotor of the rotary electric machine according to claim 7,
wherein the plate thickness T of a portion at which said non-magnetic ring comes into contact with the outer circumferential surface of said magnetic pole with respect to the plate thickness $T_0$ of a portion at which said non-magnetic ring does not come into contact with the outer circumferential surface of said magnetic pole is set to $T<T_0$.

9. The rotor of the rotary electric machine according to claim 7,
wherein said non-magnetic ring is configured such that the inner circumferential length $L_3$ of at least one end portion of said non-magnetic ring before assembly with respect to the length of an envelope $L_0$ of tangent lines each between the outer circumferential surface of said magnetic pole and the outer circumferential surface of said other adjacent magnetic pole is set to $L_0<L_3$.

10. The rotor of the rotary electric machine according to claim 7,
wherein said non-magnetic ring is configured such that at least one end portion of said non-magnetic ring before assembly is a round shape and the inner circumferential diameter $\Phi D$ with respect to the circumscribed circle diameter $\Phi D_0$ of said magnetic poles is set to $\Phi D_0<\Phi D$.

11. The rotor of the rotary electric machine according to claim 7,
wherein said non-magnetic ring is configured such that a flat plate shaped material is curved and both ends thereof are joined to be formed in a ring shape, and
developed length $L_1$ except for joint portions of said flat plate shaped material with respect to the inner circumferential length L of said non-magnetic ring before assembly is set to $L_1 \leq L$.

12. The rotor of the rotary electric machine according to claim 1,
wherein said non-magnetic ring is configured such that the inner circumferential length $L_3$ of at least one end portion of said non-magnetic ring before assembly with respect to the length of an envelope $L_0$ of tangent lines each between the outer circumferential surface of said magnetic pole and the outer circumferential surface of said other adjacent magnetic pole is set to $L_0<L_3$.

13. The rotor of the rotary electric machine according to claim 1,
wherein said non-magnetic ring is configured such that at least one end portion of said non-magnetic ring before assembly is a round shape and the inner circumferential diameter $\Phi D$ with respect to the circumscribed circle diameter $\Phi D_0$ of said magnetic poles is set to $\Phi D_0<\Phi D$.

14. The rotor of the rotary electric machine according to claim 1,
wherein said non-magnetic ring is configured such that a flat plate shaped material is curved and both ends thereof are joined to be formed in a ring shape, and
developed length $L_1$ except for joint portions of said flat plate shaped material with respect to the inner circumferential length L of said non-magnetic ring before assembly is set to $L_1 \leq L$.

15. The rotor of the rotary electric machine according to claim 1,
   wherein said non-magnetic ring and the outer circumferential surface of said magnetic poles are applied with lubricant therebetween.

16. The rotor of the rotary electric machine according to claim 1,
   wherein the inner circumferential surface of said non-magnetic ring is formed with a lubricative film.

17. The rotor of the rotary electric machine according to claim 1,
   wherein said non-magnetic ring and the outer circumferential surface of said magnetic poles are fixed with adhesive.

18. A rotor of a rotary electric machine, comprising:
   a rotor core arranged on the outer circumferential side of a rotor shaft; and
   a plurality of magnetic poles fixed to said rotor core and circumferentially arranged on said rotor core,
   said rotor including
   a non-magnetic ring attached by insertion to the outer circumference of the plurality of said magnetic poles and having a substantially polygonal shape in outer circumferential shape,
   said non-magnetic ring being configured such that the inner circumferential length L of said non-magnetic ring before assembly with respect to the length of an envelope $L_0$ of tangent lines each between the outer circumferential surface of said magnetic pole and the outer circumferential surface of said adjacent magnetic pole is set to $L<L_0$,
   wherein the plate thickness T of a portion at which said non-magnetic ring comes into contact with the outer circumferential surface of said magnetic pole with respect to the plate thickness $T_0$ of a portion at which said non-magnetic ring does not come into contact with the outer circumferential surface of said magnetic pole is set to $T<T_0$.

* * * * *